FIG. 1a

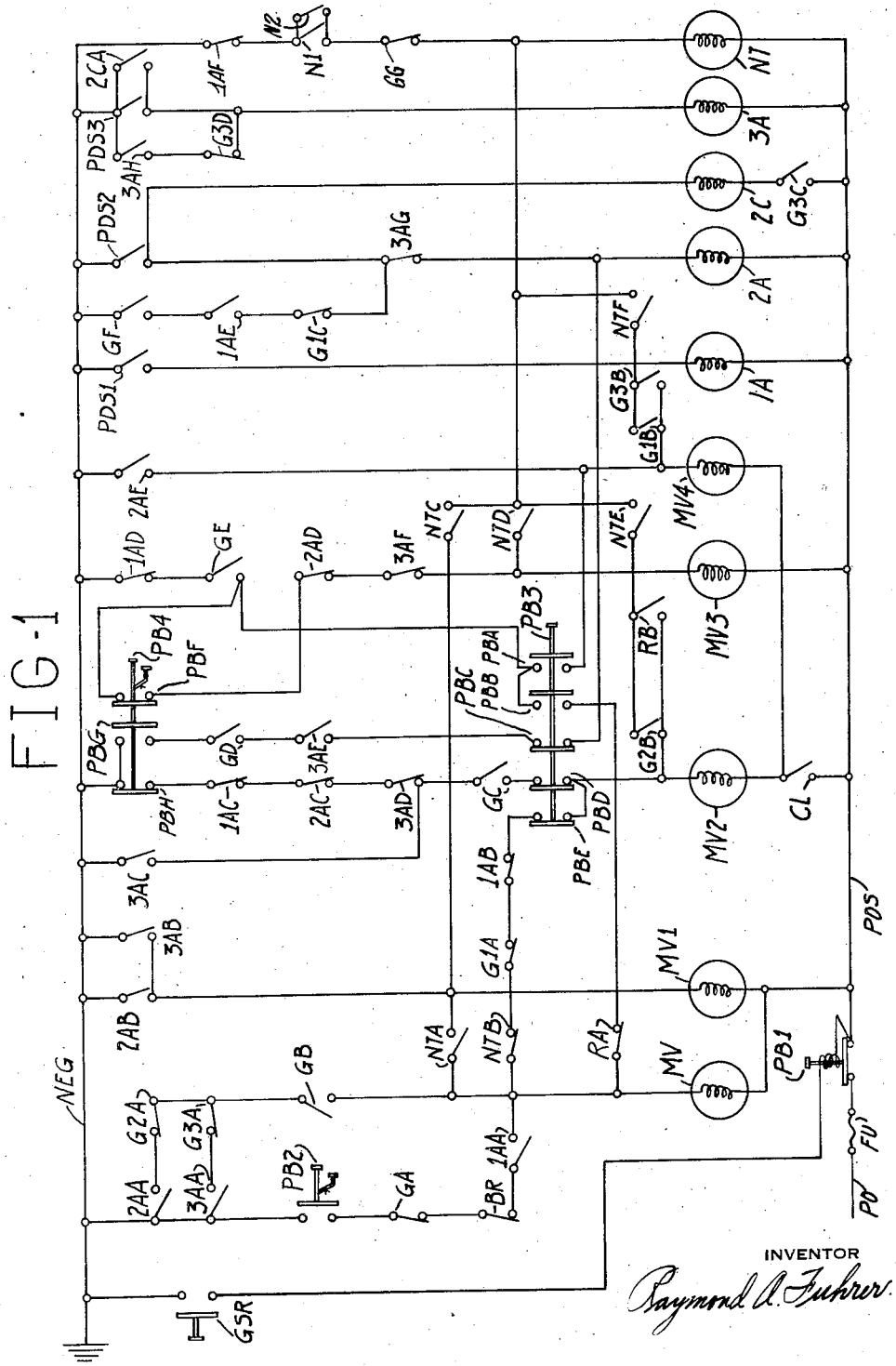

Aug. 6, 1940.   R. A. FUHRER   2,210,237
AUTOMOBILE CONTROL
Filed Oct. 8, 1932   5 Sheets-Sheet 3

INVENTOR
Raymond A. Fuhrer

Aug. 6, 1940.  R. A. FUHRER  2,210,237
AUTOMOBILE CONTROL
Filed Oct. 8, 1932  5 Sheets-Sheet 4

INVENTOR
Raymond A. Fuhrer.

INVENTOR
Raymond A. Fuhrer.

Patented Aug. 6, 1940

2,210,237

UNITED STATES PATENT OFFICE 2,210,237

AUTOMOBILE CONTROL

Raymond A. Fuhrer, Penn Township, Allegheny County, Pa.

Application October 8, 1932, Serial No. 636,831

17 Claims. (Cl. 192—.01)

The present invention relates to automobile control and more especially to automobile gear shifting. At the present time by far the large majority of automobiles in use are so arranged that gear shifting is accomplished by a gear shifting lever which is under the manual control of the operator of the vehicle.

According to the present invention there is provided a gear shift arrangement which is automatically effected for changing gears in accordance with the opening or closing of the throttle and in accordance with the speed at which the vehicle is moving, the invention providing an arrangement whereby as the throttle is opened the shifting through the various conventional stages is effected automatically and according to the speed at which the vehicle is moving. The invention is applicable to conventional gear shifting apparatus and provision is made whereby it may be selectively used or rendered inoperative at the will of the driver.

The invention further contemplates an arrangement wherein the actual shifting of the gears is effected through the operation of electromagnetically controlled valves. These valves govern the operation of fluid pressure responsive devices that are connected with suction means, such as the intake manifold of the engine. The invention provides an arrangement of circuits whereby the several electromagnetic valves are selectively operated according to the opening or closing of the engine throttle and according to the speed at which the vehicle is moving. A similar arrangement is provided for operating the clutch, and the invention further provides interlocking circuits between the clutch operating valve and the gear shifting valves whereby declutching is automatically effected before a change in gears takes place.

My invention also contemplates the use of the automobile motor where free-wheeling is provided for retarding or decreasing the rate of speed of the automobile when in the condition of free-wheeling, thus assisting the normal use of the brakes. Hitherto, automotive vehicles when in free-wheeling have been unable to utilize the braking power of the motor in assisting the brakes in retarding the speed of the vehicle.

The invention will be best understood by reference to the accompanying drawings showing the preferred form of construction and in which:

Figure 1 is a schematic circuit diagram.

Figure 1ª is a circuit diagram showing the arrangement of the circuits.

Figure 1A:
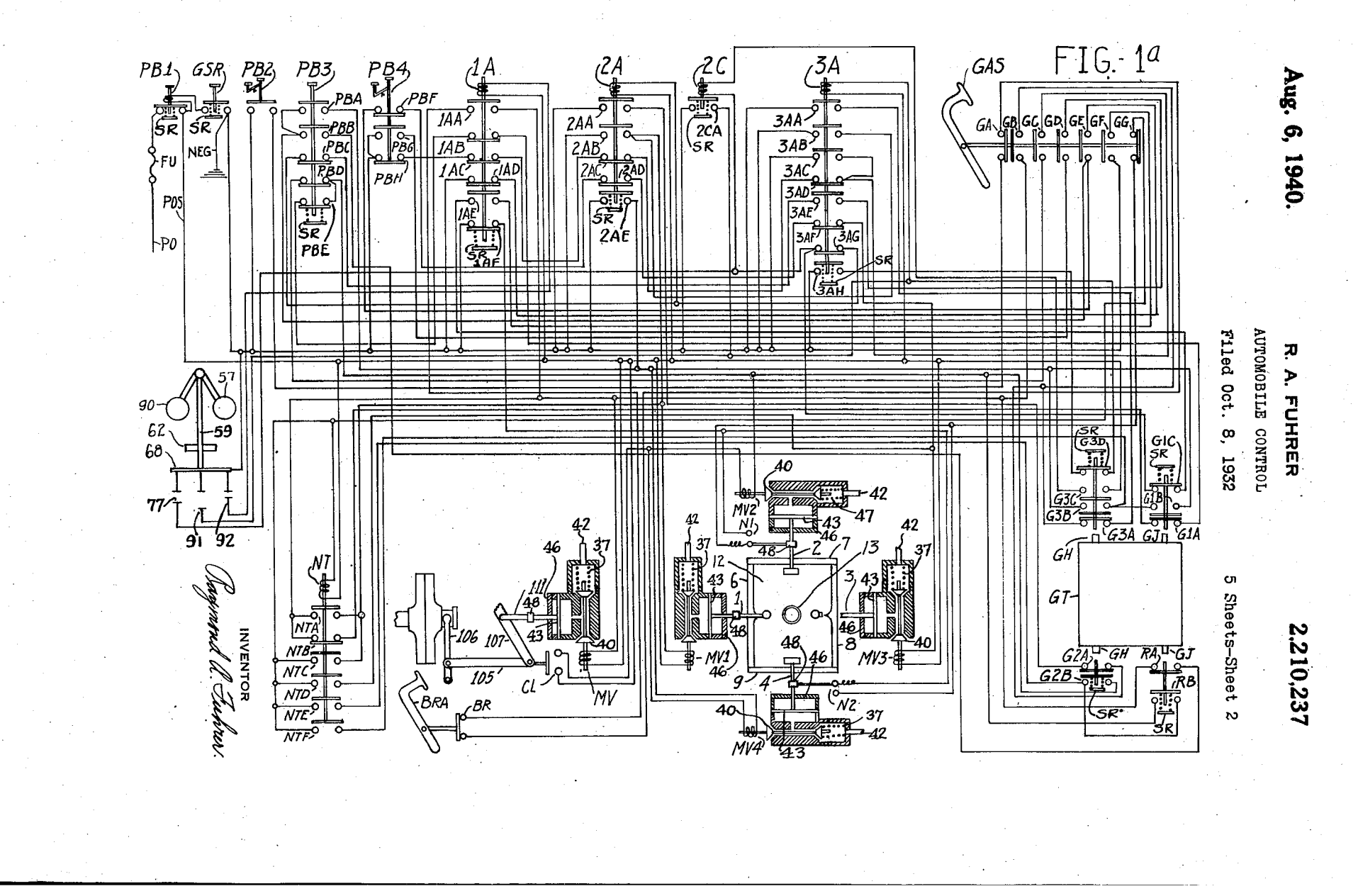
Figure 4:
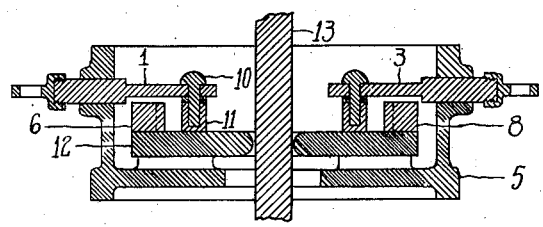
Figure 4 is a section along line 4, 4.

The gear shifting mechanism in Figure 1ª consisting of four electromagnetic valves MV1, MV2, MV3 and MV4 are placed about a gear shift rod 13 as shown. Each electromagnetic valve has attached a vacuum engine and from these engines extend rods 1, 2, 3 and 4. When the electromagnetic valves are energized from a suitable source they produce a force on the gear shift rod towards their respective vacuum engines thru rods 1, 2, 3 and 4 and plate 12. The electromagnetic valves, the gear shifting mechanism and the vacuum engines, shall be described in detail hereinafter. When a combination of two adjacent rods exert forces upon the gear shift rod they produce a conventional gear shift. Energizing MV2 and MV3 controls the pull on rods 2 and 3 producing a gear shift into first or low gear. In a similar manner, energizing MV1 and MV4 produces second or intermediate gear and energizing MV1 and MV2 produces third or high gear, and energizing MV3 and MV4 gives reverse gear. The above combinations for producing the various gears were selected to agree with a conventional gear shift when the gear shifting mechanism is placed below the fulcrum of the gear shift rod.

Referring to Figure 1ª, another electromagnetic valve MV when energized actuates the clutch by controlling a pull upon rod 111 and the connected mechanism. This electromagnetic valve controlling the clutch is energized before each gear shift and de-energized after each gear shift. An electric interlock contact CL is placed on lever 107, this assures that the clutch of the automobile is declutched before gear shifting. Other details of the clutch mechanism shall be described hereinafter.

The establishing of electric circuits that energize the various combinations of electromagnetic valves are as follows: To produce a gear shift into low or first gear when the automobile is not moving and in neutral, the electromagnetic valves MV, MV2 and MV3 are energized. The electric lead PO, Figure 1, is from the positive terminal of the automobile battery to fuse FU and thru push button PB1 to lead POS. The circuit to MV is from POS to MV and thru switches or interlocks NTB, G1A, 1AB, PBE, PBD, GC, 3AD, 2AC, 1AC and PBH to lead NEG which is negative of battery or commonly called ground. When MV is energized it causes disengagement of the clutch, this in turn closes interlock CL and establishes a circuit from POS thru CL and MV2 from here it continues to NEG similar to the above circuit. Simultaneously with the energizing MV a circuit to MV3 is established from POS thru MV3, 3AF, 2AD, PBF, GE and 1AD to NEG. Energizing MV2 and MV3 control the shift into low gear and the action of shifting breaks the established circuit to MV at G1A, this causes the clutch to engage and starts the automobile in low or first gear. The purpose of the various interlocks, magnetic contactor and switches shall be described hereinafter.

As the automobile is accelerated to approximately 7 miles per hour a contact PDS1 on the centrifugal speed switch closes. This causes magnetic contactor 1A to become energized and in turn makes or breaks a series of contacts. The centrifugal speed switch shall be described hereinafter.

As the automobile is further accelerated to approximately 14 miles per hour, a second contact PDS2 closes on the centrifugal speed switch, this energizes magnetic contactor 2A. The circuit is from POS thru 2A, 3AG and PDS2 to NEG. This contactor 2A closes a circuit to MV, MV1 and MV4 thus causing a gear shift into intermediate or second gear. The circuit to MV is from POS thru MV, GB, G2A and 2AA to NEG, simultaneously a circuit to MV1 is established from POS thru MV1 and 2AB to NEG. Then after the clutch actuates, a circuit to MV4 is made from POS thru MV4 and 2AE to NEG. The action of the shifting into second breaks the circuit to MV at G2A thus engaging the clutch and completing the shift.

Further acceleration of the automobile to approximately 20 miles per hour causes a third contact PDS3 on the centrifugal speed switch to close and this in turn energizes magnetic contactor 3A. This contactor makes a circuit to electromagnetic valves MV, MV1 and MV2. The circuits are from POS thru MV, GB, G3A and 3AA to NEG, and from POS thru MV1 and 3AB to NEG; also from POS thru CL, MV2, PBD, GC, 3AC to NEG. The action of shifting into third or high gear breaks the circuit to MV at G3A thus engaging clutch completing the shifting into third gear. Interlocks 3AH and G3D seals a contact around PDS3 assuring that after 3A is once energized it remains so until the automobile is shifted into high gear.

The automobile will continue running in third gear so long as its speed remains above approximately 14 miles per hour but if the speed is retarded to below this speed, it will backshift into second, and if speed is further reduced to below 7 miles per hour it will backshift into low providing the accelerator or throttle is open in each case. The circuit holding the automobile in third gear keeps magnetic contactor 3A energized. The circuit is from POS thru 3A, 2CA to NEG. The contact 2CA is closed by magnetic contactor 2C the latter being energized when the automobile was shifted into third gear by interlock G3C. 2C remains energized so long as contact PDS2 is closed. When PDS2 opens, it opens the circuit to 3A and closes circuit to 2A providing the circuit closing switch GF is closed. The latter switch is operated by the accelerator. The complete circuit is from POS thru 2A, 3AG, G1C, 1AE and GF to NEG. The clutch operates in the usual way. If the speed is further reduced as described above, the circuit to 2A will be opened at 1AE and MV, MV2 and MV3 will be energized as described when shifting into low gear.

When the automobile speed is retarding and the throttle closed, the automobile will not backshift into any lower speed gear but will shift into neutral at approximately 7 miles per hour thus enabling the driver to stop the automobile by only applying the brakes. The circuits that control the shift into neutral is from POS thru NT, GG, N1 or N2 and 1AF to NEG. This energizes magnetic contactor NT which in turn energizes MV, MV1, MV3 and either MV2 or MV4 depending upon what gear the automobile is in. The circuit to MV is from POS thru NTA, NTC, GG, N1 or N2, 1AF to NEG. The circuit to MV1 is from POS thru MV1, NTC, GG, N1 or N2, 1AF to NEG. The circuit to MV3 is from POS thru MV3, NTD, GG, N1 or N2, 1AF to NEG. The circuit to MV2 will be energized if the automobile is in second gear by the circuit from POS, thru CL, MV2, G2B, NTE, GG, N2 and 1AF to NEG, and if in reverse gear the circuit is from POS thru CL, MV2, RB, NTE, GG, N2 and 1AF to NEG. The circuit to MV4 when the automobile is in third gear, is from POS thru CL, MV4, G3B, NTF, GG, N1, 1AF to NEG and when the automobile is in first gear the circuit is the same except G1B is used instead of G3B.

A shift into reverse gear is controlled by energizing MV, MV3 and MV4 this is performed by depressing, preliminary to reversing, push button switch PB3 and then opening throttle. The circuit to MV is from POS thru MV, RA, PBB, GE and 1AD to NEG. The circuit to MV3 is from POS thru MV3, 3AF, 2AD, PBF, GE and 1AD to NEG, while the circuit to MV4 is from POS thru CL, MV4, PBA, GE and 1AD to NEG. The automobile will remain in reverse so long as the reversing push button PB3 and throttle is depressed.

In case it is desired when starting, to by-pass first gear, thus starting in second gear, push button switch PB4 must be operated. This switch opens the circuits to MV2 and MV3 at PBH and PBF respectively and establishes a circuit to magnetic contactor 2A when the throttle is closed. The automobile is shifted directly into second in the usual manner. The circuit established to 2A is from POS thru 2A, PBC, 3AE, GD, PBG to NEG.

Free-wheeling is produced by disengaging the clutch when the throttle is closed. This is accomplished by energizing MV by a circuit from POS thru MV, 1AA, BR, GA and switch PB2. To use the braking power of the automobile motor automatically at the end of and continuing after a period of free-wheeling, the clutch circuit is opened by the foot brake at BR interlock while the brake clearance is being taken up and this engages the clutch just before and during the foot brake application. Operating push button PB2 cuts out free-wheeling.

A main control switch PB1 placed in the positive battery lead which opens the electric control circuit making the automatic control inoperative. This switch can be manually operated and also contains an electric trip or open. If for any reason the driver of the automobile prefers to make a manual shift, a gear shift rod switch is placed on the top of the gear shift rod and when a slight upward pressure is exerted on this switch it closes a circuit that trips switch PBI making the automatic control inoperative. The details of this switch shall be described hereinafter.

The purpose of the interlocks and switches used above are as follows: When contact PDS1 on the centrifugal speed switch closes it energizes magnetic contactor 1A and this contact closing at an automobile speed of approximately 7 miles per hour, assures that interlock 1AA and 1AE are open below this speed and closed above this speed, whereas, interlocks 1AB, 1AC, 1AD and 1AF are closed below this speed and open above this speed. In a similar manner contact PDS2 energizes 2A at approximate automobile speed of 14 miles per hour. This assures contact 2AC and 2AD is closed below this speed and open above this speed, whereas, 2AA, 2AB and 2AE is open below this speed and closed above this speed. A third contact PDS3 on the centrifugal speed switch closes 3A magnetic contactor in a similar way at a speed of approximately 20 miles per hour thus assuring interlocks 3AD, 3AF and 3AG is closed below this speed and open above this speed, whereas, 3AA, 3AB, 3AC, 3AE and 3AH are open below this speed and closed above this speed. The interlocks GA and GG are controlled by the throttle, and are closed when the throttle is open and open when the throttle is closed, whereas, interlocks GB, GC, GD, GE and GF are open when the throttle is open and closed when the throttle is closed. The accelerator pedal, GAS is shown in Figure 1ᵃ in the open position or in the accelerator depressed position. Also on Figure 1ᵃ most of the switches and relays have a spring return SR attached.

The two transmission rods GH and GJ extending from transmission GT, move outward as the various gears are shifted, therefore, interlock G1A and G1C are closed when the transmission is not in first gear and open when the transmission is in first gear, whereas, interlock G1B is open when the transmission is not in first gear and is closed when in first gear. Operated by the same rod GJ and in a similar way interlock RA is closed when the transmission is not in reverse and open when the transmission is in reverse, whereas, interlock RB is open when the transmission is out of reverse and closed when the transmission is in reverse. Interlocks G3A and G3D are closed when the transmission is out of third gear and open when the transmission is in third gear, whereas, interlocks G3B and G3C are open when the transmission is not in third gear and closed when it is in third gear. Interlock G2A is closed when the transmission is not in second gear and open when it is in second gear; whereas, interlock G2B is open when the transmission is not in second gear and closed when it is in second gear. The interlocks described actuated by the transmission rods are shown also on Figure 1 and have been used in the description. Interlocks N1 and N2 when either are closed assures the car is in gear and when open assures the car is out of gear. The magnetic contactor NT which selects the various grouping of electro magnetic valves to shift the car into neutral is energized when the car is below 7 miles per hour, in gear and the throttle closed. When this magnetic valve is energized, it closes interlocks NTA, NTC, NTD, NTE and NTF and opens interlock NTB and when this magnetic contactor is deenergized, interlock NTB is closed and NTA, NTC, NTD, NTE and NTF are open. Connected to the brake pedal BRA, an interlock contact BR is closed when the brake is released. On the reversing push button PB3, contacts PBA and PBB are closed when the switch is actuated and open when the switch is released, whereas, PBC, PBD and PBE are open when the switch is actuated and closed when released.

Figure 2:
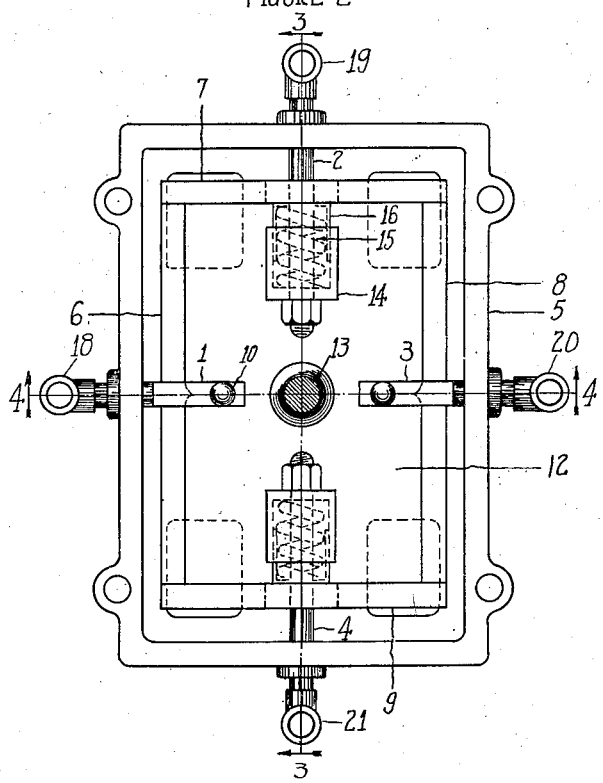
Figure 2 is a plan of the gear shifting mechanism.
Figure 3:
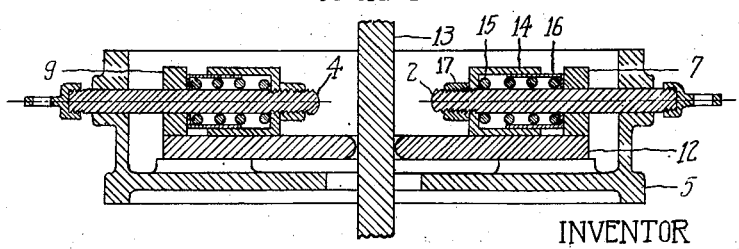
Figure 3 is a section along line 3, 3.

In Figure 2, the gear shifter mechanism; a movement outward on any of the rods 1, 2, 3 or 4, will produce a corresponding movement of plate 12 after clearance distances are taken up. Rod 1, Figure 4, when it moves outward, exerts a force on pin 10 and transmits the force to roller 11, the latter in turn pushes side 6 that is fastened to plate 12. The plate 12 pulls gear shifting rod 13. A combination of two such movements produces the equivalent of a conventional manual gear shift. The extended pointed middle part of the sides 6 and 8 serve to stop a shift into neutral from going beyond neutral into another gear. Rollers on rods 1 and 3 hit against these extended middle parts of sides 6 and 8 during a shift to neutral. When rod 2, Figure 3, moves outward, nut 17 pushes block 14 which in turn compresses spring 15, elements 7 and 9 are similar and these form the upper extended sides of the shifter plate and are fastened to the same the latter pushing against side 7. The shifter plate 12 is unfastened or floating upon four bosses of frame 5. The frame may be bolted onto the transmission case. Male clevises 18, 19, 20 and 21 are placed on the ends of rods 1, 2, 3 and 4 respectively to facilitate connections to vacuum engines.

Figure 5:
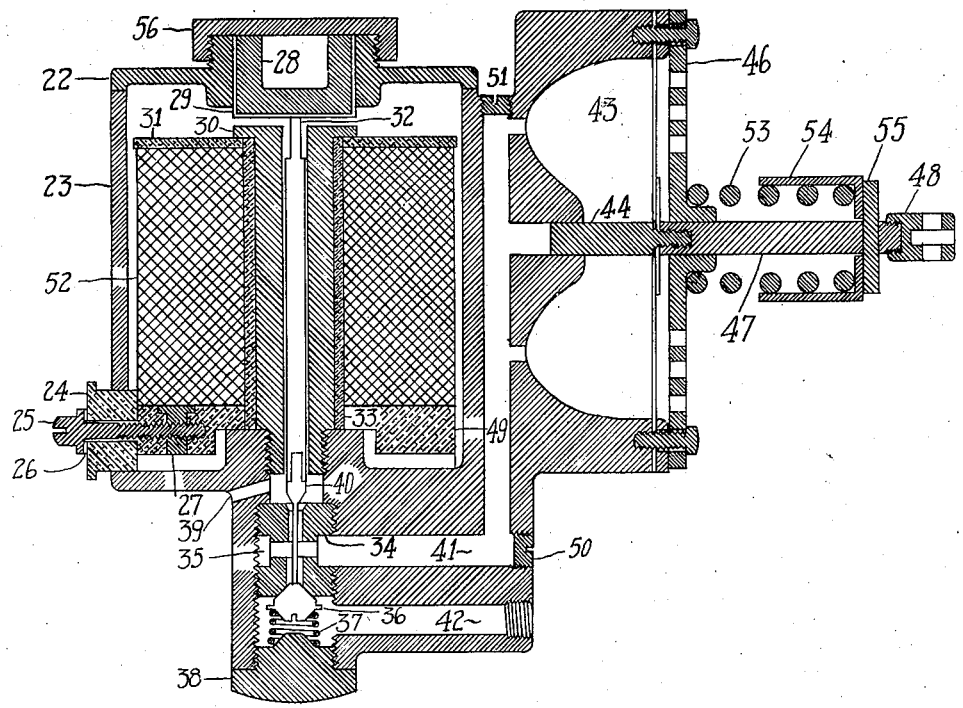
Figure 5 shows magnetic valve and vacuum engine.

Figure 5, the electromagnetic valve and vacuum engine are shown. When the coil 52 is energized it causes the armature 28 to push stem 32 against upper valve 40 which in turn opens the passage between ports 42 and 41, this connects the intake manifold to one side of diaphragm 43 and closes the atmospheric pressure from port 39 to port 41. This causes a pull on rods 44 and 47. Nut 38 supports spring 37 which seats lower valve 36 against valve seat 34. Groove 35 around valve seat 34 facilitates connection between ports 42 and 41 and between 39 and 41. The frame 23 is covered by plates 22 and 56. The coil 52 is insulated by washers 31, 33, 49 and 24. Screw 25 fastens terminal 26 and connects terminal to coil 52 thru bushing 27. Plugs 50 and 51 fill frame holes in port 41. Plate 45 strengthens diaphragm 43 while plate 46 holds diaphragm in position. Spring 53 limits and cushions the vacuum engine pull while spring holder 54 and pin 55 holds the spring in place.

Figure 6:
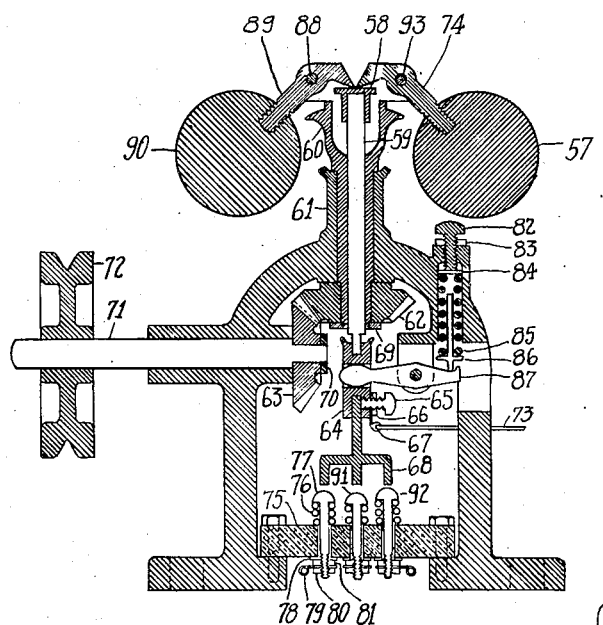
Figure 6 shows the centrifugal contact making device.

The centrifugal contact making device Figure 6, closes three electric contacts at predetermined automobile speeds. The frame 61 carries a horizontal bearing for the belt pulley shaft 71 and a vertical bearing for the sleeve 60. The arms supporting the balls 90 and 57 are pivoted to the upper parts of the sleeve 60 at pivots 88 and 93 and revolve with it. A bevel gear 62 is keyed to the lower part of the sleeve and meshes with a similar gear 63 on the belt pulley shaft 71. A belt connects the belt pulley to the automobile drive shaft. With an increase in the speed of the automobile the speed of rotation of the balls is increased. Centrifugal force causes them to move outward and upward against the force of gravity and the force of the control spring 85. The inner ends of the arms 89 and 74 are then pressed down upon the valve spindle 59 and transmits its movement thru link 64 to the three prong upper contact arm 68. This completes three circuits at three different speeds by touching the lower separated arm 92, 77 and 91 and these are the predetermined speed contacts PDS1, PDS2 and PDS3 respectively on the wiring diagram Figure 1. The automobile speed at which these contacts make may be changed by turning adjusting bolt 82, this increases the tension of the control spring 85. Lock nut 83 used to hold the bolt 82 in any given position. 84 is a steel washer and 86 a spring holder. The lever 87 transmits the spring tension to the spindle 59 thru link 64. Brass screw 65 holds the upper three prong contact arm to link 64 and brass nut 66 holds copper terminal clip 67. The latter is grounded to the automobile frame with a copper wire 73. The height of the lower arm 92, 77 and 91 may be adjusted separately by turning lock nuts on lower part of arm. Spring 76 holds arm 77 in place and lock nut 81 determines its height. The terminal clip 79 is held by lock nut 80. The lower arms are depressed while making contact and are spring returned. Insulation 75 holds the lower arm assemblies and is bolted to the frame 61. The belt pulley 72 is keyed to shaft 71. Collars 69 and 70 hold the bevel gears 62 and 63 in place.

Figure 7:
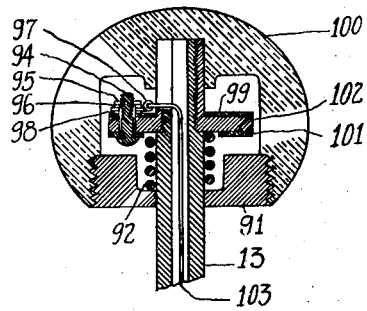
Figure 7 is a sectional view of the gear shifter rod switch.

The gear shift rod switch Figure 7, is actuated by an upward force on the glass handle 100 which is on the top of the gear shift rod. Bushing 91 is attached to glass handle 100. As these move upward the glass handle slides along the flange 102 while bushing 91 slides along gear shift rod 13 making a ground contact to insulated screw 94. This screw is connected to an insulated copper wire 103 by a terminal clip 97. The screw 94 is insulated from ground by two insulating washers 99 and 101 and is fastened by two flat brass washers 96 and 98 and a brass nut 95. The flange 102 is screwed to the gear shift rod 13 and both are slotted to allow the insulated copper wire 103 to make connection to terminal clip 97. The spring 92 breaks the contact when the upward force upon the glass handle 100 is released. The ground circuit is from bushing 91 thru spring 92 to bushing 102 and then to the gear shift rod which is connected to the automobile frame.

Figure 8:
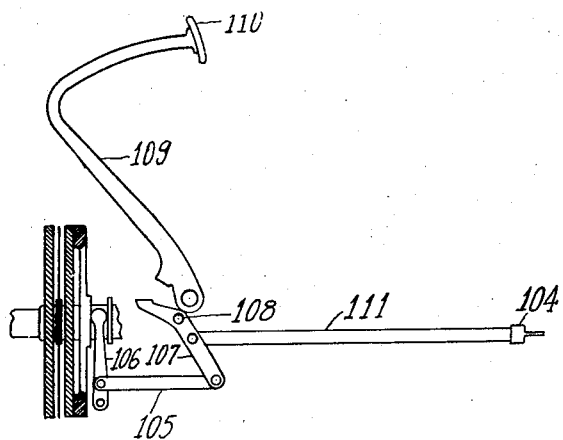
Figure 8 illustrates the clutch mechanism.

In Figure 8, the clutch is shown disengaged by a force pulling on clevis 104. This clevis may be connected directly to female clevis 48 on the vacuum engine. The outward pull on clevis 104 is transmitted to rod 111 and lever 107. The latter is pivoted at pin 108. This forces the lower end of lever 107 away from arm 106 pulling lever 105 with it and this causes the arm 106 to move towards rod 111 which disengages the clutch. The arm 106 is pivoted at the bottom. The clutch may be disengaged manually by foot pressure upon pedal 110 which will cause the clutch lever 109 to push lever 107 and cause the clutch to become disengaged as previously described. Electric interlock CL which is closed when clutch is disengaged, is shown on Figure 1ª.

Figure 1ª shows the arrangement of the electric circuits to the various devices. These devices are shown diagrammatically. The vacuum connections from the electromagnetic valves are shown broken instead of running to the intake manifold of the automobile motor.

I claim:

1. A gear shift system for vehicles comprising a fluid pressure operated declutching unit, an electromagnetically operated valve for the control thereof, a gear shift unit movable in one of four operating positions, and a neutral position, a pair of opposed fluid pressure motors for effecting sidewise motion of the gear shift unit, a pair of opposed fluid pressure motors for effecting endwise motion of said gear shift unit, an electromagnetic valve for controlling each of the fluid pressure motors of each pair, a speed responsive selector switch for relatively establishing circuits between different combinations of the electromagnetic valves of said two pairs of valves, whereby a predetermined sidewise and endwise motion of said gear shift unit is produced, and circuits whereby the electromagnetic valve selected for effecting sidewise motion is operated before the valve for effecting endwise motion is operated.

2. A gear shift system for vehicles comprising a fluid pressure operated declutching unit, an electromagnetically operated valve for the control thereof, a gear shift unit movable in one of four operating positions, and a neutral position, a pair of opposed fluid pressure motors for effecting sidewise motion of the gear shift unit, a pair of opposed fluid pressure motors for effecting endwise motion of said gear shift unit, an electromagnetic valve for controlling each of the fluid pressure motors of each pair, a speed responsive selector switch for relatively establishing circuits between different combinations of the electromagnetic valves of said two pairs of valves, whereby a predetermined sidewise and endwise motion of said gear shift unit is produced, circuits whereby the electromagnetic valve selected for effecting sidewise motion is operated before the valve for effecting endwise motion is operated, and other electric circuits whereby the valve for the declutching unit is operated to disengage the clutch in advance of operation of the valve for effecting any endwise movement of the gear shift unit and for holding the clutch disengaged until after said endwise movement has been completed.

3. A gear shift system for vehicles comprising a fluid pressure operated declutching unit, an electromagnetically operated valve for the control thereof, a gear shift unit movable in one of four operating positions, and a neutral position, a pair of opposed fluid pressure motors for effecting sidewise motion of the gear shift unit, a pair of opposed fluid pressure motors for effecting endwise motion of said gear shift unit, an electromagnetic valve for controlling each of the fluid pressure motors of each pair, a speed responsive selector switch for relatively establishing circuits between different combinations of the electromagnetic valves of said two pairs of valves, whereby a predetermined sidewise and endwise motion of said gear shift unit is produced, circuits whereby the electromagnetic valve selected for effecting sidewise motion is operated before the valve for effecting endwise motion is operated, and a throttle operating device and electric circuits controlled thereby so arranged that the operation of any of said electromagnetic valves to move the gear shift to a running gear position can occur only upon initial actuation of said throttle operating device.

4. A gear shift system for vehicles comprising a fluid pressure operated declutching unit, an electromagnetically operated valve for the control thereof, a gear shift unit movable in one of four operating positions, and a neutral position, a pair of opposed fluid pressure motors for effecting sidewise motion of the gear shift unit, a pair of opposed fluid pressure motors for effecting endwise motion of said gear shift unit, an electromagnetic valve for controlling each of the fluid pressure motors of each pair, a speed responsive selector switch for relatively establishing circuits between different combinations of the electromagnetic valves of said two pairs of valves, whereby a predetermined sidewise and endwise motion of said gear shift unit is produced, circuits whereby the electromagnetic valve selected for effecting sidewise motion is operated before the valve for effecting endwise motion is operated, other electric circuits whereby the valve for the declutching unit is operated to disengage the clutch in advance of operation of the valve for effecting any endwise movement of the gear shift unit and for holding the clutch disengaged until after said endwise movement has been completed, and a throttle operating device and electric circuits controlled thereby so arranged that the operation of any of said electromagnetic valves to move the gear shift unit to a running gear position can occur only upon initial actuation of said throttle operating device.

5. A gear shift system for vehicles comprising a fluid pressure operated declutching unit, an electromagnetically operated valve for the control thereof, a gear shift unit movable in one of four operating positions, and a neutral position, a pair of opposed fluid pressure motors for effecting sidewise motion of the gear shift unit, a pair of opposed fluid pressure motors for effecting endwise motion of said gear shift unit, an electromagnetic valve for controlling each of the fluid pressure motors of each pair, a speed responsive selector switch for relatively establishing circuits between different combinations of the electromagnetic valves of said two pairs of valves, whereby a predetermined sidewise and endwise motion of said gear shift unit is produced, circuits whereby the electromagnetic valve selected for effecting sidewise motion is operated before the valve for effecting endwise motion is operated, a throttle operating device and electric circuits controlled thereby so arranged that the operation of any of said electromagnetic valves to move the gear shift unit to a running gear position can occur only upon initial actuation of said throttle operating device, and other electric circuits whereby the speed responsive selector controls the shifting from one speed to another or back to neutral according to the speed of the vehicle and the circuits controlled by the position of the throttle operating device.

6. A gear shift system for vehicles comprising a fluid pressure operated declutching unit, an electromagnetically operated valve for the control thereof, a gear shift unit movable in one of four operating positions, and a neutral position, a pair of opposed fluid pressure motors for effecting sidewise motion of the gear shift unit, a pair of opposed fluid pressure motors for effecting endwise motion of said gear shift unit, an electromagnetic valve for controlling each of the fluid pressure motors of each pair, a speed responsive selector switch for relatively establishing circuits between different combinations of the electromagnetic valves of said two pairs of valves, whereby a predetermined sidewise and endwise motion of said gear shift unit is produced, circuits whereby the electromagnetic valve selected for effecting sidewise motion is operated before the valve for effecting endwise motion is operated, other electric circuits whereby the valve for the declutching unit is operated to disengage the clutch in advance of operation of the valve for effecting any endwise movement of the gear shift unit and for holding the clutch disengaged until after said endwise movement has been completed, a throttle operating device and electric circuits controlled thereby so arranged that the operation of any of said electromagnetic valves to move the gear shift unit to a running gear position can occur only upon initial actuation of said throttle operating device, and other electric circuits whereby the speed responsive selector controls the shifting from one speed to another or back to neutral according to the speed of the vehicle and the circuits controlled by the position of the throttle operating device.

7. In a gear shift for motor vehicles, a plurality of fluid pressure motors operatively connected with the gear shift mechanism, electromagnetically controlled valves to regulate the pressure in said fluid motors, another electromagnetically controlled valve operatively connected with a clutch operating mechanism, a plurality of circuits for said electromagnetic valves, said circuits being such that the operation of the said first electromagnetically controlled valves can follow a speed responsive circuit closer for progressively energizing circuits to certain of said valves, a throttle operable circuit closer for all of said circuits, and means in the circuits for controlling the clutch operating mechanism for establishing communication with said other electromagnetic valves only after a definite timed relation to the operation of said electromagnetic clutch operating valve.

8. In a gear shift system for motor vehicles, a gear shift unit movable in one of four operating positions, and a neutral position, a fluid pressure operated declutching unit, an electromagnetic valve for the control thereof, a plurality of fluid pressure cylinders connected to the gear shift unit, electromagnetic valves controlling the rising and lowering of fluid pressure to said cylinders, a speed responsive selector for relatively establishing circuits between different combinations of electromagnetic valves whereby a predetermined sidewise and endwise motion of said gear shift unit is produced, circuits whereby the electromagnetic valve selected for effecting sidewise motion is operated before the valve for effecting endwise motion is operated, other electric circuits whereby the valve for the declutching unit is operated to disengage the clutch in advance of operation of the valve for effecting movement of the gear shift unit and for holding the clutch disengaged until after said movement has been completed, a throttle operating device and electric circuits controlled thereby so arranged that the operation of any of said electromagnetic valves to move the gear shift unit to any operating position can occur only upon initial actuation of said throttle operating device, other electric circuits whereby the speed responsive selector controls the shifting from one speed to another or back to neutral according to the speed of vehicle the position of the throttle operating device and the gear shift operating position and means by-passing the circuits to certain of said electromagnetic valves selected for effecting a movement of the gear shift unit to the lowest operating gear position.

9. In a gear shift system for motor vehicles, a gear shift unit movable in one of four operating positions, and a neutral position, a fluid pressure operated declutching unit, an electromagnetic valve for the control thereof, a plurality of fluid pressure cylinders connected to the gear shift unit, electromagnetic valves controlling the rising and lowering of fluid pressure to said cylinders, a speed responsive selector for relatively establishing circuits between different combinations of electromagnetic valves whereby a predetermined sidewise and endwise motion of said gear shift unit is produced, circuits whereby the electromagnetic valve selected for effecting sidewise motion is operated before the valve for effecting endwise motion is operated, other electric circuits whereby the valve for the declutching unit is operated to disengage the clutch in advance of operation of the valve for effecting movement of the gear shift unit and for holding the clutch disengaged until after said movement has been completed, a throttle operating device and electric circuits controlled thereby so arranged that the operation of any of said electromagnetic valves to move the gear shift unit to any operating position can occur only upon initial actuation of said throttle operating device, other electric circuits whereby the speed responsive selector controls the shifting from one speed to another or back to neutral according to the speed of the vehicle the position of the throttle operating device and the gear shift operating position and electric means sealing the established circuits to the electromagnetic valves selected for effecting a movement of the gear shift unit to the highest operating gear position whereby the gear shift unit is operable only after a predetermined vehicle speed is obtained below that speed when the gear shift unit was caused to move to the highest operating gear position.

10. In a gear shift system for motor vehicles, a gear shift unit movable in one of four operating positions, and a neutral position, a fluid pressure operated declutching unit, an electromagnetic valve for the control thereof, a plurality of fluid pressure cylinders connected to the gear shift unit, electromagnetic valves controlling the rising and lowering of fluid pressure to said cylinders, a speed responsive selector for relatively establishing circuits between different combinations of electromagnetic valves whereby a predetermined sidewise and endwise motion of the said gear shift unit is produced, circuits whereby the electromagnetic valve selected for effecting sidewise motion is operated before the valve for effecting endwise motion is operated, other electric circuits whereby the valve for the declutching unit is operated to disengage the clutch in advance of the operation of the valve for effecting movement of the gear shift unit and for holding the clutch disengaged until after said movement has been completed, a throttle operating device and electric circuits controlled thereby so arranged that the operation of any of the said electromagnetic valves to move the gear shift unit to any operating position can occur only upon initial actuation of said throttle operating device, other electric circuits whereby the speed responsive selector controls the shifting from one speed to another or back to neutral according to the speed of the vehicle the position of the throttle operating device and the gear shift operating position, means by-passing the circuits to certain of said electromagnetic valves selected for effecting a movement of the gear shift unit to the lowest operating gear position and electric means sealing the established circuits to the electromagnetic valves selected for effecting a movement of the gear shift unit to the highest operating gear position whereby the gear shift unit is operable only after a predetermined vehicle speed is obtained below that speed when the gear shift unit was caused to move to the highest operating gear position.

11. In a gear shift system for motor vehicles, a gear shift unit movable in one of four operating positions, and a neutral position, a fluid pressure operated declutching unit, an electromagnetic valve for the control thereof, a plurality of fluid pressure cylinders connected to the gear shift unit, electromagnetic valves controlling the rising and lowering of fluid pressure to said cylinders, a speed responsive selector for relatively establishing circuits between different combinations of electromagnetic valves whereby a predetermined sidewise and endwise motion of the said gear shift unit is produced, circuits whereby the electromagnetic valve selected for effecting sidewise motion is operated before the valve for effecting endwise motion is operated, other electric circuits whereby the valve for the declutching unit is operated to disengage the clutch in advance of the operation of the valve for effecting movement of the gear shift unit and for holding the clutch disengaged until after said movement has been completed, a throttle operating device and electric circuits controlled thereby so arranged that the operation of any of the said electromagnetic valves to move the gear shift unit to any operating position can occur only upon initial actuation of said throttle operating device, other electric circuits whereby the speed responsive selector controls the shifting from one speed to another or back to neutral according to the speed of the vehicle the position of the throttle operating device and the gear shift operating position, electric means sealing the established circuits to the electromagnetic valves selected for effecting a movement of the gear shift unit to the highest operating gear position whereby the gear shift unit is operable only after a predetermined vehicle speed is obtained below that speed when the gear shift unit was caused to move to the highest operating gear position and other electric means controlled by the position of the throttle operating device and by the operation of the speed responsive selector whereby the gear shift unit is operable directly to the neutral position from any of the said operating gear positions.

12. In a gear shift system for motor vehicles, a gear shift unit movable in one of four operating positions, and a neutral position, a fluid pressure operated declutching unit, an electromagnetic valve for the control thereof, a plurality of fluid pressure cylinders connected to the gear shift unit, electromagnetic valves controlling the rising and lowering of fluid pressure to said cylinders, a speed responsive selector for relatively establishing circuits between different combinations of electromagnetic valves whereby a predetermined sidewise and endwise motion of the said gear shift unit is produced, circuits whereby the electromagnetic valve selected for effecting sidewise motion is operated before the valve for effecting endwise motion is operated, other electric circuits whereby the valve for the declutching unit is operated to disengage the clutch in advance of the operation of the valve for effecting movement of the gear shift unit and for holding the clutch disengaged until after the said movement has been completed, a throttle operating device and electric circuits controlled thereby so arranged that the operation of any of the said electromagnetic valves to move the gear shift unit to any operating position can occur only upon initial actuation of said throttle operating device, other electric circuits whereby the speed responsive selector controls the shifting from one speed to another or back to neutral according to the speed of the vehicle the position of the throttle operating device and the gear shift operating position, means by-passing the circuits to certain of said electromagnetic valves selected for effecting a movement of the gear shift unit to the lowest operating gear position, electric means sealing the established circuits to the electromagnetic valves selected for effecting a movement of the gear shift unit to the highest operating gear position whereby the gear shift unit is operable only after a predetermined vehicle speed is obtained below that speed when the gear shift unit was caused to move to the highest operating gear position and other electric means controlled by the position of the throttle operating device and by the operation of the speed responsive selector whereby the gear shift unit is operable directly to the neutral position from any of the said operating gear positions.

13. In a gear shift system for motor vehicles, a gear shift unit movable in one of four operating positions, and a neutral position, a fluid pressure operated declutching unit, an electromagnetic valve for the control thereof, a plurality of fluid pressure cylinders connected to the gear shift unit, electromagnetic valves controlling the rising and lowering of fluid pressure to said cylinders, a speed responsive selector for relative establishing circuits between different combinations of electromagnetic valves whereby a predetermined sidewise and endwise motion of the said gear shift unit is produced, circuits whereby the electromagnetic valve selected for effecting sidewise motion is operated before the valve for effecting endwise motion is operated, other electric circuits whereby the valve for the declutching unit is operated to disengage the clutch in advance of the operation of the valve for effecting movement of the gear shift unit and for holding the clutch disengaged until after the said movement has been completed, a throttle operating device and electric circuits controlled thereby so arranged that the operation of any of the said electromagnetic valves to move the gear shift unit to any operating position can occur only upon initial actuation of said throttle operating device, other electric circuits whereby the speed responsive selector controls the shifting from one speed to another or back to neutral according to the speed of the vehicle the position of the throttle operating device and the gear shift operating position and other electric means controlled by the speed responsive selector whereby circuits established to the electromagnetic valves selected to effect a movement of the gear shift unit to reverse operating gear position are operable only below a predetermined vehicle speed.

14. In a gear shift system for motor vehicles, a gear shift unit movable in one of four operating positions, and a neutral position, a fluid pressure operated declutching unit, an electromagnetic valve for the control thereof, a plurality of fluid pressure cylinders connected to the gear shift unit, electromagnetic valves controlling the rising and lowering of fluid pressure to said cylinders, a speed responsive selector for relatively establishing circuits between different combinations of electromagnetic valves whereby a predetermined sidewise and endwise motion of the said gear shift unit is produced, circuits whereby the electromagnetic valve selected for effecting sidewise motion is operated before the valve for effecting endwise motion is operated, other electric circuits whereby the valve for the declutching unit is operated to disengage the clutch in advance of the operation of the valve for effecting movement of the gear shift unit and for holding the clutch disengaged until after the said movement has been completed, a throttle operating device and electric circuits controlled thereby so arranged that the operation of any of the said electromagnetic valves to move the gear shift unit to any operating position can occur only upon initial actuation of said throttle operating device, other electric circuits whereby the speed responsive selector controls the shifting from one speed to another or back to neutral according to the speed of the vehicle the position of the throttle operating device and the gear shift operating position, means by-passing the circuits to certain of said electromagnetic valves selected for effecting a movement of the gear shift unit to the lowest operating gear position, electric means sealing the established circuits to the electromagnetic valves selected for effecting a movement of the gear shift unit to the highest operating gear position whereby the gear shift unit is operable only after a predetermined vehicle speed is obtained below that speed when the gear shift unit was caused to move to the highest operating gear position, other electric means controlled by the position of the throttle operating device and by the operation of the speed responsive selector whereby the gear shift unit is operable directly to the neutral position from any of the said operating gear positions and other electric means controlled by the speed responsive selector whereby circuits established to the electromagnetic valves selected to effect a movement of the gear shift unit to reverse operating gear position are operable only below a predetermined vehicle speed.

15. In a gear shift system for motor vehicles, a gear shift unit movable in one of four operating positions, and a neutral position, a fluid pressure operated declutching unit, an electromagnetic valve for the control thereof, a plurality of fluid pressure cylinders connected to the gear shift unit, electromagnetic valves controlling the rising and lowering of fluid pressure to said cylinders, a speed responsive selector for relatively establishing circuits between different combinations of electromagnetic valves whereby a predetermined sidewise and endwise motion of the said gear shift unit is produced, circuits whereby the electromagnetic valve selected for effecting sidewise motion is operated before the valve for effecting endwise motion is operated, other electric circuits whereby the valve for the declutching unit is operated to disengage the clutch in advance of the operation of the valve for effecting movement of the gear shift unit and for holding the clutch disengaged until after the said movement has been completed, a throttle operating device and electric circuits controlled thereby so arranged that the operation of any of the said electromagnetic valves to move the gear shift unit to any operating position can occur only upon initial actuation of said throttle operating device, other electric circuits whereby the speed responsive selector controls the shifting from one speed to another or back to neutral according to the speed of the vehicle the position of the throttle operating device and the gear shift operating position and other electric means sealing the established circuits to the electromagnetic valves selected for effecting a movement of the gear shift unit to the second operating gear position whereby the gear shift unit will engage the first operating gear position only after a lower vehicle speed is obtained than the speed where the gear shift unit will engage the second operating gear position from the first operating gear position.

16. In a gear shift system for motor vehicles, a gear shift unit movable in one of four operating positions, and a neutral position, a fluid pressure operated declutching unit, an electromagnetic valve for the control thereof, a plurality of fluid pressure cylinders connected to the gear shift unit, electromagnetic valves controlling the rising and lowering of fluid pressure to said cylinders, a speed responsive selector for relatively establishing circuits between different combinations of electromagnetic valves whereby a predetermined sidewise and endwise motion of the said gear shift unit is produced, circuits whereby the electromagnetic valve selected for effecting sidewise motion is operated before the valve for effecting endwise motion is operated, other electric circuits whereby the valve for the declutching unit is operated to disengage the clutch in advance of the operation of the valve for effecting movement of the gear shift unit and for holding the clutch disengaged until after the said movement has been completed, a throttle operating device and electric circuits controlled thereby so arranged that the operation of any of the said electromagnetic valves to move the gear shift unit to any operating position can occur only upon initial actuation of said throttle operating device, other electric circuits whereby the speed responsive selector controls the shifting from one speed to another or back to neutral according to the speed of the vehicle the position of the throttle operating device and the gear shift operating position, other electric means controlled by the speed responsive selector whereby circuits established to the electromagnetic valves selected to effect a movement of the gear shift unit to reverse operating gear position are operable only below a predetermined vehicle speed and other electric means sealing the established circuits to the electromagnetic valves selected for effecting a movement of the gear shift unit to the second operating gear position whereby the gear shift unit will engage the first operating gear position only after a lower vehicle speed is obtained than the speed where the gear shift unit will engage the second operating gear position from the first operating gear position.

17. In a gear shift system for motor vehicles, a gear shift unit movable in one of four operating positions, and a neutral position, a fluid pressure operated declutching unit, an electromagnetic valve for the control thereof, a plurality of fluid pressure cylinders connected to the gear shift unit, electromagnetic valves controlling the rising and lowering of fluid pressure to said cylinders, a speed responsive selector for relatively establishing circuits between different combinations of electromagnetic valves whereby a predetermined sidewise and endwise motion of the said gear shift unit is produced, circuits whereby the electromagnetic valve selected for effecting sidewise motion is operated before the valve for effecting endwise motion is operated, other electric circuits whereby the valve for the declutching unit is operated to disengage the clutch in advance of the operation of the valve for effecting movement of the gear shift unit and for holding the clutch disengaged until after the said movement has been completed, a throttle operating device and electric circuits controlled thereby so arranged that the operation of any of the said electromagnetic valves to move the gear shift unit to any operating position can occur only upon initial actuation of said throttle operating device, other electric circuits whereby the speed responsive selector controls the shifting from one speed to another or back to neutral according to the speed of the vehicle the position of the throttle operating device and the gear shift operating position, means by-passing the circuits to certain of said electromagnetic valves selected for effecting a movement of the gear shift unit to the lowest operating gear position, electric means sealing the established circuits to the electromagnetic valves selected for effecting a movement of the gear shift unit to the highest operating gear position whereby the gear shift unit is operable only after a predetermined vehicle speed is obtained below that speed when the gear shift unit was caused to move to the highest operating gear position, other electric means controlled by the position of the throttle operating device and by the operation of the speed responsive selector whereby the gear shift unit is operable directly to the neutral position from any of the said operating gear positions, other electric means controlled by the speed responsive selector whereby circuits established to the electromagnetic valves selected to effect a movement of the gear shift unit to reverse operating gear position are operable only below a predetermined vehicle speed and other electric means sealing the established circuits to the electromagnetic valves selected for effecting a movement of the gear shift unit to the second operating gear position whereby the gear shift unit will engage the first operating gear position only after a lower vehicle speed is obtained than the speed where the gear shift unit will engage the second operating gear position from the first operating gear position.

RAYMOND A. FUHRER.